S. CARR.
HAY PRESS.
APPLICATION FILED OCT. 28, 1908.
927,829.
Patented July 13, 1909.
2 SHEETS—SHEET 2.
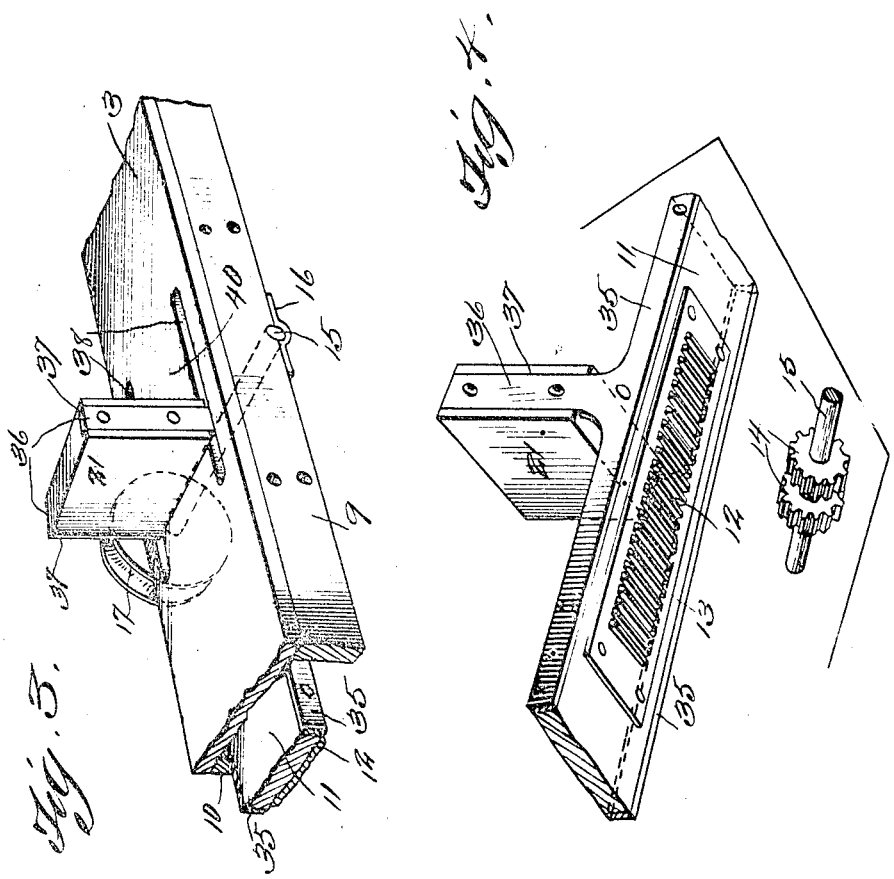
Witnesses
Inventor
S. Carr
By D. Swift &C.
Attorneys

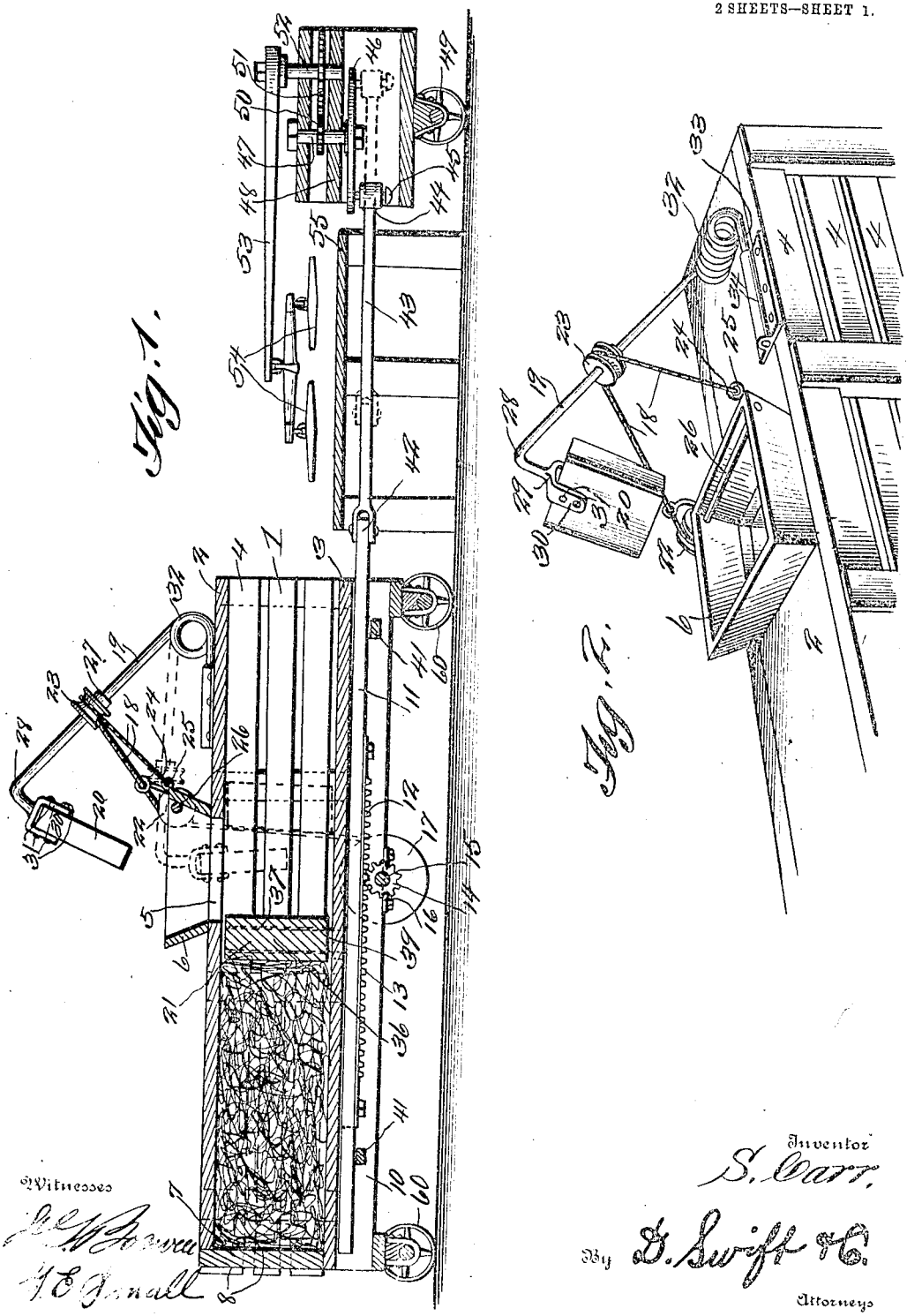

UNITED STATES PATENT OFFICE.

SHELTON CARR, OF TYRONZA, ARKANSAS.

HAY-PRESS.

No. 927,829.

Specification of Letters Patent.

Patented July 13, 1909.

Application filed October 23, 1908. Serial No. 459,395.

*To all whom it may concern:*

Be it known that I, SHELTON CARR, a citizen of the United States, residing at Tyronza, in the county of Poinsett and State of Arkansas, have invented a new and useful Hay-Press; and I do hereby declare the following to be a full, clear, and exact description of the invention, such as will enable others skilled in the art to which it appertains to make and use the same.

The invention about to be set forth and claimed pertains to a new and useful hay press, and the invention in its fundamental characteristics provides for its object means by which, when the hay is thrown into the hopper, the same is fed or forced thoroughly into the press, and forward of the plunger, as will be clearly apparent from the drawings.

A further object of the invention is to provide means coöperative between the plunger rack and the feeding means, so as to force the feeding means downward and in front of the plunger, that is to say, when the plunger has almost reached the limit of its backward stroke, and when the plunger is on its forward stroke, the feeding means is automatically withdrawn from the hopper and from the path of the plunger, as is evident.

The invention directs as a further object to provide means comprising a plurality of gears, connected to the plunger rack, for the purpose of reciprocating the same; these gears are operated by a beam which is operated in a circle by a team of horses.

The invention provides as a further object means by which the apparatus is rendered portable from place to place, as will be clearly observed in the drawings.

This invention comprises further objects and combinations of elements, which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice, with the understanding that the changes and variations accruing from said reduction to practice are limited to the scope of the appended claims.

To obtain a full and correct understanding of the details of construction, combinations of features, elements and advantages, reference is to be had to the hereinafter set forth description and the accompanying drawings in connection therewith, wherein—

Figure 1 is a longitudinal sectional view of the improved hay press, showing the plunger and its operating rack partly in section and elevation, means for operating the plunger rack, and further illustrating the feeding means, whereby the hay is forced or fed into the press through the hopper. Fig. 2 is a perspective view of a portion of the upper portion of the hay press, clearly illustrating the feeding means therefor. Fig. 3 is a perspective view of the lower portion of the hay press, showing the sides and the top eliminated and the plunger and a portion of its rack displayed in perspective. Fig. 4 is a perspective view of the plunger and its rack, and the pinions which coöperate with the rack for reciprocating the plunger.

In the drawings, wherein similar reference characters indicate corresponding parts in the several illustrations, 1 designates a rectangular elongated frame or casing, comprising upper and lower solid strips 2 and 3 and slatted sides 4, as clearly shown. The upper strip 2 is provided with an opening 5 around which the wall of the hopper 6 is positioned, as shown in Fig. 1. The end of the rectangular frame or casing is provided with a removable end gate 7, which is slidable in guides 8, so that when the hay is pressed sufficiently, the said gate can be removed so that the hay which is pressed into the form of a bale may be pushed or forced out.

The strip or base 3 of the casing is provided with downwardly depending flanges or sides 9 and 10, between which the plunger member or rod or bar 11 reciprocates, as clearly shown. To the lower face of the bar or rod 11 is bolted a suitable rack 12, as shown clearly in Figs. 1 and 4. This rack, as shown in Fig. 1, has its teeth 13 in mesh with a pinion or gear 14, which is mounted upon and movable with the shaft 15, which is journaled in suitable bearings 16 of the said depending flanges or sides 9 and 10, as shown.

One end of the shaft 15 is provided with a pulley or winding drum 17, to which is anchored a rope or cable 18, which is designed as the pulley or drum 17 rotates to wind thereabout, so that the spring member or arm 19, may be drawn downward, so as to force the feeding member 20 through the hopper and into the casing in front of the plunger 21, that is to say, when the plunger is drawn backward, as shown in dotted lines in Fig. 1. In this manner the hay is packed through the hopper into the casing, and forward of the plunger.

The rope or cable 18 engages or passes over a pulley 22, and also over a pulley 23 slidably journaled upon the spring member or arm 19, and the end 24 of said rope or cable is securely fastened to an eye 25, of the said hopper, as clearly shown in Figs. 1 and 2. The pulley 22 is journaled upon the rod 26, which is mounted in bearings of the hopper.

The pulley 23 is limited in one direction upon the spring member or arm 19, by an annular shoulder 27, and as the spring arm or member 19 is drawn downward, the said pulley 23 is designed to move outward upon the said spring member or arm 19, so that the rope or cable will have a direct pull from the said pulley. The said spring member or arm 19 is bent at an angle, as at 28, and the extreme end portion 29 of the angled portion of the member is forked, and between the arms 30 of said forked portion the feeding member 20 is secured by suitable fastening means 31, as will be seen clearly in Figs. 1 and 2.

The spring member or arm 19 terminates in a coil spring 32, the end portion 33 thereof extends into a barrel or member 34, which is secured to the upper portion of the casing, as will be seen clearly in Figs. 1 and 2.

The plunger 21 is movable with the bar or rod 11, as will be clearly evident on an examination of the drawings. The bar or rod 11 has secured to its sides strengthening plates 35, and extending upward from their center portions are arms or members 36, which are positioned and secured in recesses 37 of the said plunger 21, as shown clearly in Figs. 1 and 4. The arms or members 36 extend through slots 38 of the strip or base 3 of the said casing, there being a space 39 intermediate the bar or rod 11 and the lower face of the plunger 21, to accommodate that portion 40 of the strip or base 3 of the casing which is positioned between the said slots, as shown.

Extending across the under face of the bar or rod 11, and secured to the depending flanges or sides 9 and 10 are strips 41, designed for the purpose of guiding the rod or bar 11 as it reciprocates.

Pivoted to the rod or bar 11, as at 42, is a pitman 43, the end 44 of which is mounted upon a pin 45 carried by a rotating disk 46, the shaft 47 of which is mounted in suitable bearings of a portable frame 48, which is provided with suitable wheels 49, as shown in Fig. 1. The shaft 47 is provided with a gear 50, which is in mesh with the gear 51, the shaft 52 of which is mounted in bearings of the said portable frame 48, as shown in Fig. 1. Fixed to and rotatable with the shaft 52 is a beam or tongue 53, to the extreme end of which a suitable double tree 54 is connected, as shown in Fig. 1. A tread or platform 55 bridges over the pitman 43 and a portion of the rod or bar 11, and over which a team of horses or oxen are designed to travel, which team of horses or oxen is designed to be connected to the double tree.

As the beam or tongue 53 is rotated, power is transmitted to the gears 50 and 51 and the disk 46, which causes the pitman and rod or bar 11 to be reciprocated, thus causing the plunger to be moved backward, as shown in dotted lines in Fig. 1, and when the said plunger is approaching the limit of its backward movement the feeding member is forced downward, in advance of the said plunger, so as to feed the hay into the press. When the plunger is on its forward movement or stroke, the feeding member is withdrawn from in advance of the said plunger, by the spring member or arm 19, as will be clearly manifest.

From the foregoing, the essential features, elements and the operation of the device, together with the simplicity thereof, will be clearly apparent.

Having thus fully described the invention, what is claimed as new and useful, by the protection of Letters Patent, is:—

1. In a hay press, a casing, a plunger movable therein and provided with a rack, a shaft having a pinion in mesh with the rack, a pulley or drum on the shaft, a feeding member and means connecting the feeder and the drum adapted to operate the feeder when the plunger is moved.

2. In a portable hay press, a casing, a movable plunger therein and provided with a rack, a shaft extending transverse of the casing and provided with a pinion in mesh with said rack, a pulley or drum movable with the shaft, a spring member having coils in its central portion secured to the casing and provided with an arm, said arm having a feeding member and provided with a rotatable slidable member, and a rope connected to the casing and passing over the said rotatable slidable member, and having a portion wound about said drum and its end connected thereto so as to operate the feeding member when the plunger is moved.

In testimony whereof I have signed my name to this specification in the presence of two subscribing witnesses.

SHELTON CARR.

Witnesses:
H. C. OVERLURP,
W. A. BEARLY.